Aug. 25, 1959  A. SERAFIN  2,900,820
DIFFERENTIAL ORAL THERMOMETER
Filed July 28, 1955

INVENTOR.
ARDIS SERAFIN
BY
Barnes, Kisselle, Laughlin & Raisch
ATTORNEYS.

# United States Patent Office 2,900,820
Patented Aug. 25, 1959

2,900,820

DIFFERENTIAL ORAL THERMOMETER

Ardis Serafin, Detroit, Mich.

Application July 28, 1955, Serial No. 524,957

4 Claims. (Cl. 73—342)

This invention relates to a clinical thermometer for making a plurality of independent simultaneous temperature readings at separate oral locations and for directly recording the temperature differential therebetween.

I have discovered that at times there is a temperature differential between right and left side regions of the human mouth and that at other times the temperatures of these regions are the same. Through observation, I have concluded that a comparison of the temperatures at different oral locations provides an indication of current interrelations between emotion, intellection and bodily energies generally. For example, a higher temperature on one side of the mouth, such as the right side, indicates a present harmonious interaction of mental and bodily processes and a resulting efficient utilization of creative energy while a higher temperature on the other side of the mouth indicates a present conflict between such inner processes and a resulting waste of creative energy. I believe that a charting of such temperature readings may be valuable in diagnosing physical and mental disturbances.

The oral temperature readings can be made with ordinary clinical thermometers inserted under right and left portions of the tongue. However, for more accurate results it is desirable to take simultaneous readings and heretofore it has been necessary to use two separate thermometers. It is inconvenient and difficult to hold two thermometers in the mouth and there is no positive means for securing thermometers in properly spaced relation to insure the desired readings. The danger of breakage is increased in using two thermometers and the inconvenience of shaking them down following use is doubled. Co-pending application Serial No. 486,760, filed by this inventor on February 8, 1955, now Patent No. 2,870,636, discloses a thermometer structure for obtaining simultaneous independent temperature readings at separate predetermined oral locations.

I have found that the temperatures of different regions of the human mouth and the temperature differentials of these regions may vary relatively rapidly. I have concluded through observation that these temperature changes and these changes in temperature differential must be recorded at frequent intervals in order to obtain a proper evaluation of their significance. The readings must be accurate and accordingly must be devoid of human error insofar as possible.

An object of this invention is to provide a simple, inexpensive, improved thermometer structure for rapidly obtaining simultaneous temperature readings at separate parts of the mouth and for obtaining at the same time a direct reading of the temperature differential. The invention is carried out generally by means of two independent electrical resistance thermometers arranged to take separate oral temperature readings, each thermometer having an ammeter graduated to read directly in degrees Fahrenheit. A galvanometer, also graduated in degrees Fahrenheit, is connected between the two thermometers to provide the differential reading. The ammeters and galvanometer are closely grouped in a casing to facilitate generally simultaneous reading thereof. One form of the invention is shown in the accompanying drawings.

Figure 1:
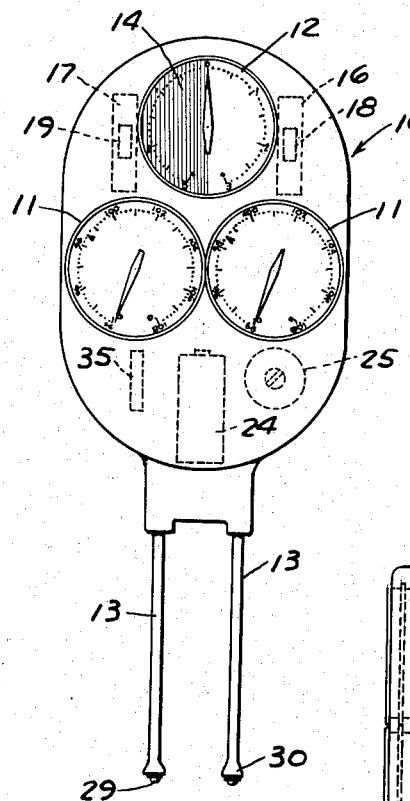
Fig. 1 is a generally front elevational view of a device according to this invention with some parts shown in phantom.
Figure 2:
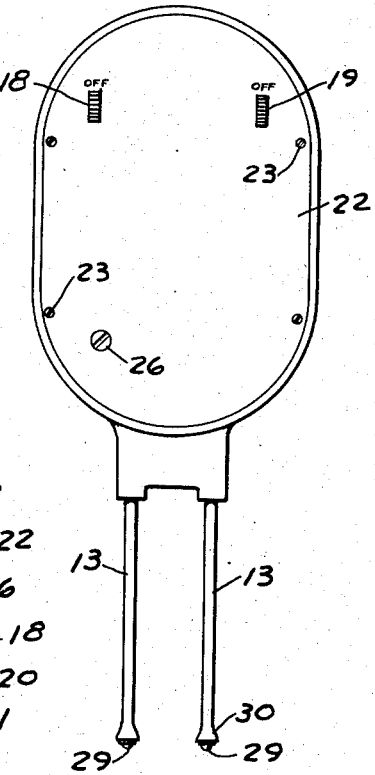
Fig. 2 is a rear elevational view of the device.

The device shown in the drawings has a body 10 forming a housing for two ammeters 11 having finite resistances and a galvanometer 12 and forming a support for two thermometer stems 13 spaced apart a predetermined distance and adapted to be inserted into a human mouth. The ammeters are graduated to read directly in degrees Fahrenheit over ordinary range of body temperatures. The galvanometer is graduated to read directly in degrees Fahrenheit from zero to positive and negative readings of about three degrees. One side of the galvanometer face is preferably colored or shaded as illustrated at 14.

Figure 3:
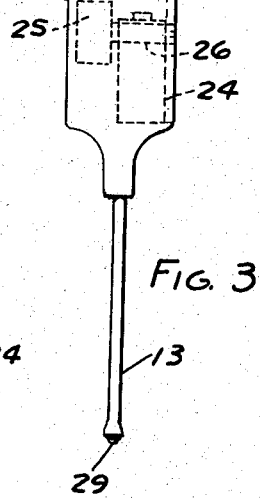
Fig. 3 is a side elevation with some parts broken away and shown in phantom to illustrate structure.
Figure 5:
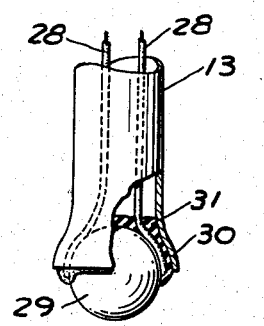
Fig. 5 is an enlarged fragmentary partly sectional view showing detail at an end of a thermometer stem.

Body 10 also houses two switches 16 and 17 manually operable respectively by buttons 18 and 19 projecting through openings 20 (Fig. 3) in a back plate 22 removably secured on the housing by such means as screws 23. A replaceable battery 24 and a variable resistor 25 are mounted within the body, the resistor having an operating shaft 26 projecting through an opening provided therefor in back plate 22 and being slotted as shown for engagement by a screwdriver.

Each stem 13 is preferably formed of stainless steel and houses insulated electrical conduits 28 which are electrically connected to a resistance element 29 secured within the expanded lower end 30 of the stem. Conduits 28 and resistor 29 are insulated from the lower end of the stem by insulation 31 which in practice may comprise a layer of lacquer or other suitable insulating material. Resistors 29 are preferably spherical shaped as shown and are formed of a material whose electrical resistance varies responsively and sensitively to relatively small temperature changes. Such resistors are known in the art, an example being that known commercially as the Veco-type bead thermistor. Resistors 29 are preferably matched.

Figure 4:
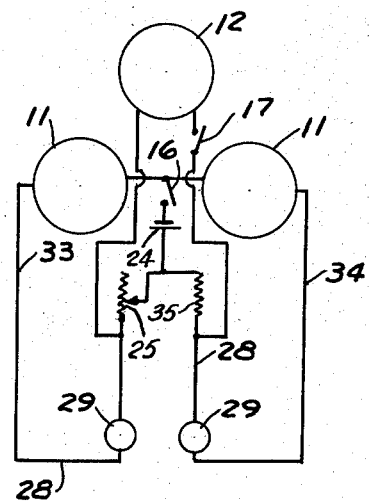
Fig. 4 is a diagrammatic view illustrating an electrical circuit for the device.

The electrical apparatus is connected as indicated in the circuit diagrammed in Fig. 4. Each ammeter 11 is connected in series with a bead resistor 29 and with battery 24 to provide two parallel circuits 33 and 34 which have a common switch 16. Circuit 33 contains variable resistor 25 and circuit 34 contains a fixed resistor 35. Galvanometer 12 is connected across circuits 33 and 34 as shown and switch 17 is included in the galvanometer circuit.

In use, it may be assumed that a battery 24 has been assembled in the device as described and that switches 16 and 17 are open. Switch 16 is closed to establish a current in circuits 33 and 34. Variable resistor 25 is adjusted by turning shaft 26 with a screwdriver until the two circuits are balanced as indicated by the readings on ammeters 11.

To take a temperature reading, stems 13 are inserted into the mouth so that bead resistors 29 contact predetermined regions of the mouth preferably under opposite sides of the tongue. Buttons 18 and 19 are manually manipulated to close switches 16 and 17. The current flowing through circuits 33 and 34 will vary independently according to the temperatures of their respective resistors 29 and the temperatures of the regions of the mouth contacted by resistors 29 will be independently recorded on ammeters 11.

Galvanometer 12 measures the current differential between circuits 33 and 34 and accordingly measures directly the temperature differential between the oral regions contacted by resistors 29. If this differential is zero, the galvanometer will read zero; if the right or left resistor 29 is warmer than the other, the galvanometer needle will be deflected accordingly to the right or left and will record in degrees Fahrenheit the amount of the temperature differential.

The thermometer structure is very sensitive to temperature changes so that the thermometer need not be shaken down after each use and so that a number of readings may be taken in relatively rapid succession. Moreover, a continuous reading may be taken over a relatively extended period to observe visually the effects of external influences on oral temperatures and temperature differentials. The galvanometer provides a direct reading of temperature differentials and eliminates human error which might result in computing a temperature differential arithmetically. The ammeters and galvanometer are grouped in a relatively small cluster to facilitate substantially simultaneous reading.

When the thermometer is not in use switches 16 and 17 are opened to prolong the life of battery 24. Battery 24 may be replaced by removing screws 23 and back plate 22. Circuits 33 and 34 may be recalibrated from time to time as required by turning shaft 26. It is contemplated that battery 24 may comprise a relatively small 1½ volt dry cell, ammeters 11 having from zero to 50 micro-amperes capacity and galvanometer 12 having from zero to 20 micro-amperes capacity.

I claim:

1. A clinical thermometer for indicating directly the temperatures of and temperature differential between different oral regions, said thermometer comprising, a body, a pair of stems projecting away from said body, a plurality of temperature responsive variable electrical resistance elements in exposed position on said stems, said stems being adapted to be inserted into a human mouth, said stems being spaced apart a predetermined distance so that said elements will contact predetermined separate regions of the mouth, an electrical circuit connected to each of said elements, said circuits being connected in parallel to a battery on said body so that the current in said circuits will vary independently and responsively to the temperatures of the separate oral regions, ammeter means in each of said circuits operative to measure the current therein and being arranged to indicate directly an oral temperature, said ammeter means being positioned on a portion of said body, galvanometer means on said portion of said body, said galvanometer means being connected across said circuits for measuring the current differential therebetween, said galvanometer means being arranged to indicate directly the temperature differential between the separate oral regions, said portion of said body being arranged to extend outside of the mouth when said stems are inserted therein, whereby to obtain a direct visual reading of the temperatures of and temperature differential between the separate oral regions.

2. A clinical thermometer for indicating directly simultaneous plural oral temperature readings and for indicating directly the temperature differential between different oral regions, said thermometer comprising, a body, a pair of stems projecting away from said body, a plurality of temperature responsive variable electrical resistance elements in exposed position on said stems, said stems being adapted to be inserted into a human mouth, said stems being spaced apart a predetermined distance so that said elements will contact predetermined separate regions of the mouth, an electrical circuit connected to each of said elements, a battery on said body connected to said circuits so that the current in said circuits will vary independently and responsively to the temperatures of the separate oral regions, an ammeter in each circuit for measuring the current therein, said ammeters being mounted on a portion of said body, a galvanometer on said portion of said body, said galvanometer being connected across said circuits for measuring the current differential therebetween, said ammeters being arranged to indicate directly the temperatures at the separate oral regions, said galvanometer means being arranged to indicate directly the temperature differential between the separate oral regions, said portion of said body being arranged to extend outside of the mouth when said stems are inserted therein, whereby to obtain a direct visual reading of the temperatures and of the temperature differential between the separate oral regions.

3. A clinical thermometer for indicating directly simultaneous plural oral temperature readings and for indicating directly the temperature differential between different oral regions, said thermometer comprising, a pair of independent electrical resistance thermometers, said thermometers being spaced apart a predetermined distance on a common support, said thermometers being arranged and adapted to be inserted in the human mouth for obtaining independent temperature readings at predetermined separate regions of the mouth, each of said thermometers including an ammeter, said ammeters being mounted on said support and being arranged to indicate directly the temperatures at the separate oral regions, a single battery on said support, said thermometers being electrically connected to said battery, at least one of said thermometers including a manually operable variable resistor for calibrating said thermometers relatively to each other, a galvanometer on said support, said galvanometer being connected across said thermometers for measuring the current differential therebetween, said galvanometer being arranged to indicate directly the temperature differential between the separate oral regions, said ammeters and galvanometer being positioned on said support so that they lie outside of the mouth when said thermometers are in temperature recording position, said ammeters and galvanometer being clustered to facilitate substantially simultaneous readings thereof.

4. A clinical thermometer for indicating directly the temperatures of and temperature differential between different oral regions, said thermometer comprising, a support, a source of electric current on said support, means supported by and projecting away from said support and being adapted to be inserted within a human mouth, said means carrying a plurality of temperature responsive variable electrical resistance elements in exposed position with said elements being spaced apart a predetermined distance to contact predetermined separate regions of the mouth, an electrical circuit interconnecting each of said elements and said source of electric current so that the current in said circuits will vary independently and responsively to the temperatures of the separate oral regions, each circuit including ammeter means carried by said support and being operable responsive to current in said circuit to indicate an oral temperature and galvanometer means carried by said support and connected across said circuits, said galvanometer means being operable to indicate current differential between said circuits, whereby to measure temperature differential between the separate oral regions, said ammeter means and galvanometer means being positioned on said support for visual observation outside of a human mouth when said projecting means is inserted within a human mouth to obtain temperature readings.

References Cited in the file of this patent

UNITED STATES PATENTS

| | | |
|---|---|---|
| 1,552,284 | Evins | Sept. 1, 1925 |
| 2,753,714 | Perkins et al. | July 10, 1956 |

FOREIGN PATENTS

| | | |
|---|---|---|
| 614,628 | Great Britain | Dec. 20, 1948 |

OTHER REFERENCES

Article: "A Device—for Obtaining Body Temperature—" by Williams et al. published in Science, vol. 108, July 23, 1948, pp. 90, 91.